United States Patent [19]
Tange

[11] 4,445,703
[45] May 1, 1984

[54] HEAD SET ARRANGEMENT FOR BICYCLE

[75] Inventor: Michiaki Tange, Osaka, Japan

[73] Assignee: Marui Ltd., Hyogo, Japan

[21] Appl. No.: 396,436

[22] Filed: Jul. 8, 1982

[30] Foreign Application Priority Data

Oct. 16, 1981 [JP] Japan .......................... 56-154475[U]

[51] Int. Cl.³ .............................................. B62K 21/06
[52] U.S. Cl. .................... 280/279; 308/187.1
[58] Field of Search .............. 280/279, 280, 276, 277, 280/270; 308/187.1, 36.1

[56] References Cited

U.S. PATENT DOCUMENTS

| 589,204 | 8/1897 | Cobb | 308/187.1 |
| 1,526,008 | 2/1925 | Olson | 308/187.1 |
| 2,512,148 | 6/1950 | Gaines | 308/187.1 X |
| 3,295,863 | 1/1967 | Joulmes | 280/279 X |

FOREIGN PATENT DOCUMENTS 1415 of 1926 Australia .............................. 280/279

*Primary Examiner*—John A. Pekar
*Attorney, Agent, or Firm*—Cantor and Lessler

[57] ABSTRACT

A head set arrangement for a bicycle comprises a crown ball race provided with an annular groove in its outer periphery close to its bottom, a circular ring formed of a resilient material and fitted into said groove, a bottom ball head cup provided with an annular groove in its inner periphery close to its bottom. The circular ring is then placed in the second-mentioned annular groove in non-contact position.

7 Claims, 2 Drawing Figures

HEAD SET ARRANGEMENT FOR BICYCLE

BACKGROUND OF THE INVENTION

The present invention relates to improvements in head sets for bicycles, and more particularly in dust-proof and waterproof type head set arrangements.

Bicycle head sets must be smoothly turnable for steering. However, the prior art arrangement has disadvantages in that dust or water may enter it from between a bottom ball head cup and a crown ball race and/or a top ball head cup and a screwed ball race (top cone). Thus bearing parts or other ball-abutting parts undergo rusting and wearing which have an adverse influence on the turning and steering capacity of handlebars. To avoid this, it has been proposed to use sealed bearings. Such a proposal is undesirable, however, since the height and weight of a hanger set would be increased. Increases in height and weight go against a current trend toward reducing the size and weight of parts as much as possible.

SUMMARY OF THE INVENTION

The present invention provides a solution to the abovementioned problems and has for its object to provide a novel head set arrangement for a bicycle, which is rendered water- and dust-proof without leading to an increase in the size and weight of parts.

According to the present invention, this object is achieved by the provision of a head set arrangement for a bicycle, comprising a ball race member, a ball head cup member, a sealing ring of a resilient material interposed between the outer periphery of said ball race member and the inner periphery of said ball head cup member and attached to one of said member, and an annular groove formed in the other member and adapted to receive therein said ring in non-contact position.

BRIEF DESCRIPTION OF THE DRAWINGS

This and other objects and features of the present invention will now be apparent from a reading of the following detailed description with reference to the accompanying drawings, in which.

DETAILED DESCRIPTION OF THE INVENTION

Figure 1:
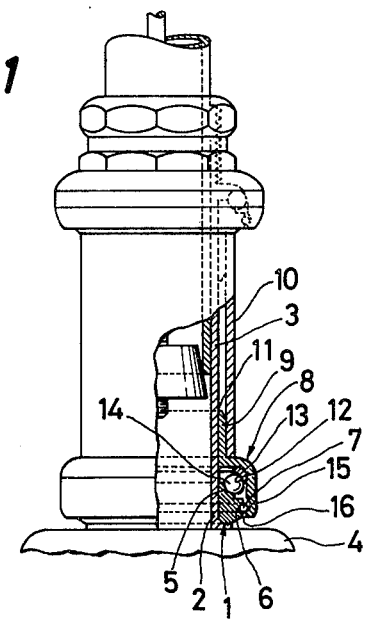
FIG. 1 is a partially cut away front view of the head set according to the present invention.
Figure 2:
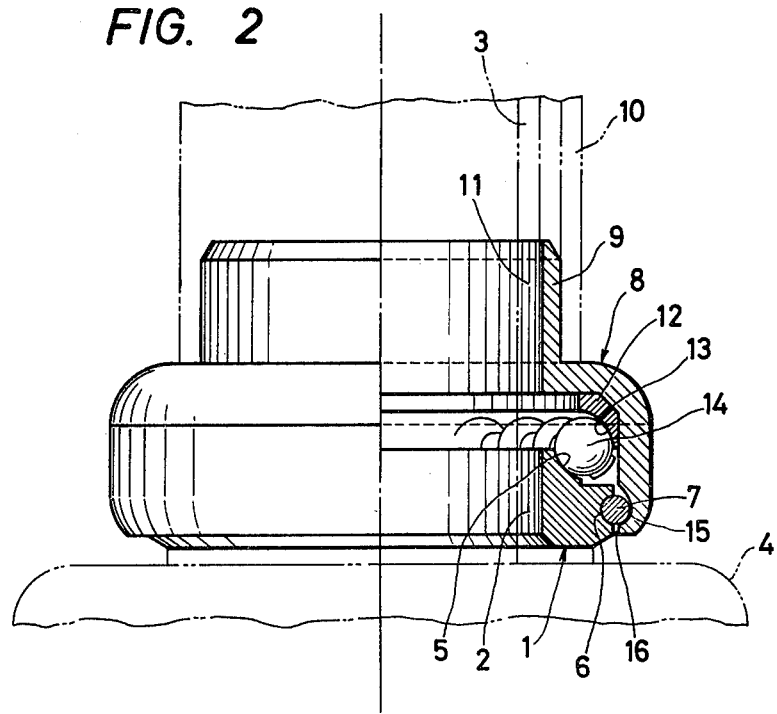
FIG. 2 is a front view, in partially longitudinal section, of part of the same.

A crown ball race 1 is inserted over a fork stem 2 through its central bore 3, and fixed to the upper part of a fork crown 4. The race 1 has an inclined upper plane 5 for receiving a ball, and an annular semi-circular groove 6 in its outer periphery close to its bottom. Into the groove 6 is fitted a circular ring 7 serving as a sealing ring and made of a resilient material such as a synthetic resin, preferably a synthetic rubber.

A bottom ball head cup 8, preferably formed of a light alloy, is rotatably inserted over the fork stem 2 through its central bore 11, and has a short upper portion 9 of smaller diameter, which is engaged within a head pipe 10. Within the bottom ball head cup is disposed an annular track member 12 having on its lower side an inclined plane 13 for receiving a ball. A bearing ball 14 is interposed between the crown ball race 1 and the track member 12. The cup 8 has an annular semi-circular groove 15 formed in its inner periphery close to its bottom. The circular ring is placed in this groove 15 in non-contact position. More specifically, the circular ring is placed in the groove 15 at a slight interval of about 0.25 mm therefrom so as to permit smooth turning of the cup.

A space between the outer periphery of race 1 and the inner periphery of arm 8 is shown at 16.

The action and effect of the arrangement according to the present invention will now be explained.

Little or no entrance of dust or water into the arrangement will occur due to the presence of the curved space 16 defined by the circular ring 7 and the annular groove 15 within the said circular ring which is placed in non-contact position. Accordingly, there is no possibility that bearing parts or other ball-abutting parts may be rusted or worn off. This assures smooth turning of the cup, and helps maintain satisfactory steering capacity.

While the present invention has been explained in connection with one embodiment in which the inventive arrangement is applied between the crown ball race 1 and the bottom ball head cup 8, it is understood that the arrangement is separately or simultaneously to be between a screwed ball race (top cone) and a top ball head cup with the same action and effect, although not illustrated. The circular ring may be fixed to the inner periphery of cup 8, rather than to the outer periphery of race 1. Furthermore, the arrangement according to the present invention may be applied to a steel arm which needs no track member.

What is claimed is:

1. A head set arrangement for a bicycle, comprising a ball race member, a ball head cup member, a sealing ring of a resilient material interposed between the outer periphery of said race member and the inner periphery of said cup member and fitted to one of said members, and an annular groove formed in the other member and adapted to receive therein said ring with a slight gap therebetween.

2. The head set arrangement as recited in claim 1, in which said sealing ring is a circular ring formed of synthetic rubber.

3. The head set arrangement as recited in claim 1, in which said sealing ring is placed in said annular groove at a slight interval of about 0.25 mm therefrom so as to permit smooth turning of said cup member.

4. The arrangement as recited in claim 1, wherein said ball race member is a crown ball race and said ball end cup member is a bottom ball head cup.

5. The head set arrangement as recited in claim 1, in which said annular groove is of a semi-circle in cross-section.

6. The arrangement as recited in claim 1, wherein said ball race member is a screwed ball race, or top cone, and said ball head cup member is a top ball head cup.

7. A head set arrangement for a bicycle, comprising a crown ball race inserted, through its central bore, over a fork stem and fixed to the upper part of a fork crown, and provided with an annular semi-circular groove in its outer periphery close to its bottom, a circular ring formed of synthetic rubber fitted into said groove, a bottom ball head cup formed of a light alloy, rotatably inserted over said fork stem through its central bore, and provided with an annular semi-circular groove in its inner periphery close to its bottom, an annular track member disposed within said bottom ball head cup, and a bearing ball interposed between the said crown ball race and said track member, said circular ring being placed in the second-mentioned annular groove with a slight gap therebetween.

* * * * *